United States Patent [19]

Fischer et al.

[11] Patent Number: 5,160,151
[45] Date of Patent: Nov. 3, 1992

[54] SELF CENTERING CHUCK

[75] Inventors: David Fischer, Aschaffenburg; Rudolf Kohlert, Stockstadt, both of Fed. Rep. of Germany

[73] Assignee: Römheld GmbH, Laubach, Fed. Rep. of Germany

[21] Appl. No.: 491,312

[22] Filed: Mar. 9, 1990

[30] Foreign Application Priority Data

Mar. 9, 1989 [EP] European Pat. Off. ........ 89104172.5

[51] Int. Cl.$^5$ .............................................. B23B 31/16
[52] U.S. Cl. ................................... 279/121; 269/234; 279/110; 279/4.12
[58] Field of Search ...................... 279/121, 71, 70, 69, 279/57, 7, 110, 2 A, 4, 6, 1 L, 1 DA, 1 DC; 269/234; 242/72.1; 33/644, 645

[56] References Cited

U.S. PATENT DOCUMENTS

| 1,786,147 | 12/1930 | Bullard ................. 279/121 |
| 4,508,357 | 4/1985 | Reich .................... 279/4 X |
| 4,747,609 | 5/1988 | Scharfen ............. 279/121 X |

FOREIGN PATENT DOCUMENTS 270597  9/1950  France ....................... 279/69

*Primary Examiner*—Larry I. Schwartz
*Assistant Examiner*—Robert Schultz
*Attorney, Agent, or Firm*—R. H. Siegemund

[57] ABSTRACT

A self-centering chuck includes a plurality of centering and clamping slides disposed for slide movement to or from a common center, drive slides are associated with the centering and clamping slides, the latter having parallel or slightly oblique orientation to the drive slides means so as to slidingly move at least essentially parallel to the slide movement of at least one of the centering and clamping slides, the centering slides and the drive slides have wedge surfaces; a plurality of shift pins extend transversely to the centering and clamping slides and to the drive slides and cooperate with the wedge surfaces to couple the drive slides to the centering and clamping slides to obtain movement to or from the center of all centering slides; the shift pins each movein one direction in relation to the respective centering and clamping slide when the drive slides moves in one direction, and the shift pins move in an opposite direction when the drive slides move in the respective opposite direction, the movements of the pins being essentially transversely to the movements of the slides; the drive slides being connected to the shift pins such that for uniform movement of the drive slides in one direction, at least two centering and clamping slides move oppositely in relation to each other; the pins have also wedge surfaces at their respective ends, the wedge surfaces being steeper at one end as compared with the opposite end of the same pin.

19 Claims, 3 Drawing Sheets

SELF CENTERING CHUCK

BACKGROUND OF THE INVENTION

The present invention relates to elements which, in combination, clamp workpieces in a centrally orienting fashion for purposes of enabling working them. The basic field of employment includes lathes, but the utilization within the field of stationary working is preferred. Devices, elements and combinations thereof are known in the following variety and exhibit the following drawbacks.

The centering vise uses racks and pinions or left-handed or right-handed spindle threads in order to obtain centering movements for clamping. The rack and pinion arrangement is disadvantaged by the fact that holding forces are always just as high as the clamping force. There is thus little safety provided to counteract the effect of percussions and impacts as they inevitably occur during working. In the case of delicate workpieces which must not be clamped too tightly, this is indeed a significant drawback. Using opposing thread pitches is troublesome because of inaccuracies arising from the increase in thread play. This approach, moveover, is limited to manual operation. Both kinds of approaches are practiced with two-bracket arrangements only. The brackets, moreover, are either stationarily positioned or slidable on centering slides. This, however, restricts the range of clamping. Also it is a considerable disadvantages that tilting moments may have to be taken up by the movable brackets, a factor which immediately increases the friction in the guide structure. This effect drastically increases with the height of the brackets and requires long and expensive guide structures coupled with a limiting in the employment of low clamping heights.

Another device is the key hook chuck which quite frequently is realized by a piston shaped key way hook standing in the center and driving lying centering clamping slide. This approach is disadvantaged by the fact that the play of the standing piston is directly responsible for causing a play of the entire packing unit. Also, there is a limitation as to height owing to the tilting moments as described earlier. Moreover, in the case of the four brackets wedge hook packing, both directions of movement are interconnected so that only good fitting and matching workpieces can actually be centered. This, however, contradicts the very purpose of centering, namely, the elimination-through-centering of tolerances. Still other drawbacks, being particularly noticeable for stationary employment, are large vertical dimensions on account of the standing piston and its guiding structure. Also at best add-on brackets can be displaced on the centering slides. Hence the size variability as well as the mounting space requirement is always as large as the packing housing.

A third approach is the so-called shift lever chuck. It is, however, not very common. A vertical hook pin drives lying centering slides through angularly bent deflection levers. Again, just as in the case of the rack-and-pinion device, the holding back force is just as the clamping force. All the other drawbacks are the same as mentioned above, namely, limits on account of tilting moments, undue vertical dimensions limits concerning dimensional variability coupling of the directions of movement, etc.

A fourth approach is the spiral or scroll chuck. Herein radially positioned centering clamping slides are usually driven by Archimede's spirals. Limitations to this approach again include limits on account of tilting moments, coupling of the directions of movement; the dimensional variability is even more limited on account of the specific spiral; and specific to this approach are the problems posed by inaccuracies and play generally. Hence this kind of equipment has been limited in its use to manually and rather simple kinds of clamping.

DESCRIPTION OF THE INVENTION

It is an object of the present invention to provide a new and improved, universal set of centering elements for purposes of clamping, avoiding all of the aforementioned drawbacks and to render more attractive, less expensive, and highly variable, particularly for stationary employment, the highly valuable principle of centering clamping of workpieces.

In according with the preferred embodiment of the present invention, a self-centering device with preferably power driven opposing centering clamping slides is suggested which has the following combination of features; several drive slides are parallelly oriented with reference to the centering clamping slides or have a slightly oblique orientation thereto; these drive slides drive oriented deflection or shift pins under utilization of several wedge configurations; the deflection or shift pins in turn drive the centering clamping slides by means of further wedge configurations; the several wedge configurations are oppositely inclined such that centering clamping slide movements obtain which run in opposite directions, even through the drive slides all move in one and the same direction on advance, and they all move in the opposite direction on retraction. These and other features can be summarized as follows. Drive slides are at least approximately parallelly positioned in relation to the centering clamping slides and they drive deflection and shift pins by means of and through wedge configurations or structures, and theses pins in turn drive the centering clamping slides via additional wedge configurations. Owing to opposing orientations of the several kinds of wedge elements, opposing movements of the centering slides obtain even though the drive motion is an unidirectional one.

DESCRIPTION OF THE DRAWINGS

While the specification concludes with claims particularly pointing out and distinctly claiming the subject matter which is regarded as the invention, it is believed that the invention, the objects and features of the invention and further objects and features as well as advantages of the invention will be better understood from the following description taken in connection with the accompanying drawings in which

Proceedings now to the detailed description of the drawing, FIG. 1 shows a fixed arrangement that includes two centering clamping slides 6 and 7 mounted in parallel relation to a drive slide 1. A first pair of upright shift pins 4 and 5 cooperates with wedge configurations 2 to shift the centering clamping slide 6 while pins 4' and 5' cooperate with wedge configurations 3 in an opposing manner such that on a particular movement of drive 1 the slide 6 and 7 move or shift in opposite directions.

The shift pins 4 and 5, 4' and 5' are in each instance provided with oblique wedge like surfaces such that they work only with compression, as they cooperate with convex drive slide surfaces 3 and concave ones, 2. This is a very simple and robust construction. A slide 6 or 7 is in each instance driven by two pins; 4, 5 and 4', 5' respectively. They alternate in the movement of the respective slide and mutually return each other.

The center of drive slide 1 has a cutout. As far as this device itself is concerned, it is not needed, but in the case of a four-element chuck construction with two crossing drive slides, the respective transverse drive slide, such as 10 in FIG. 2, will pass through that cut out.

Figure 1:
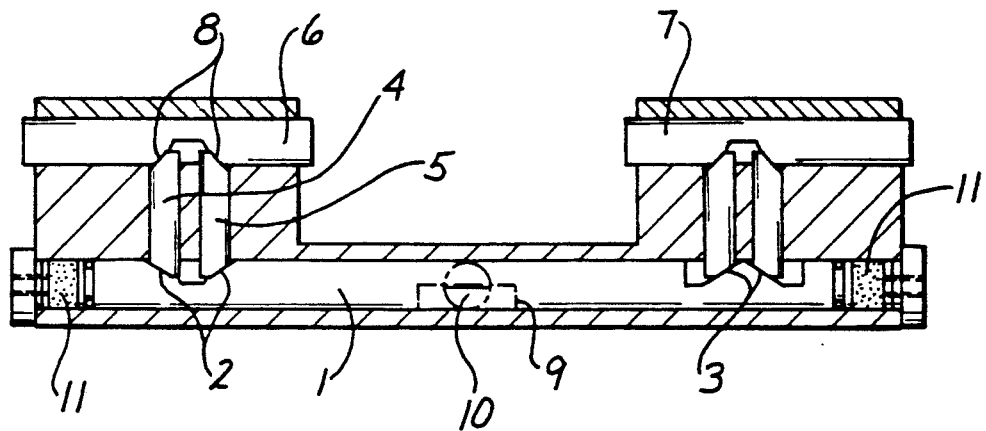
FIG. 1 is a longitudinal section view through a self-centering and clamping assembly in accordance with the preferred embodiment of the present invention for practicing a best mode configuration, showing particularly a fixed two-element configuration.

The rod like drive slide 1 establishes directly a hydraulic piston; to the left and to the right are oil pressure compartments 11 which alternatingly receive pressurized oil. In the particular example of FIG. 1, any play is taken up by the press forces of the pins 4, etc. Owing to the multiplication of the friction effects, a very large holding force obtains. These will be even more pronounced the steeper the upper wedge surface 8 as compared with the steepness of the lower ones, 2 and 3. Interpreting the drawing to be to scale, there is a 6-fold holding force as compared with the clamping force.

Figure 2:
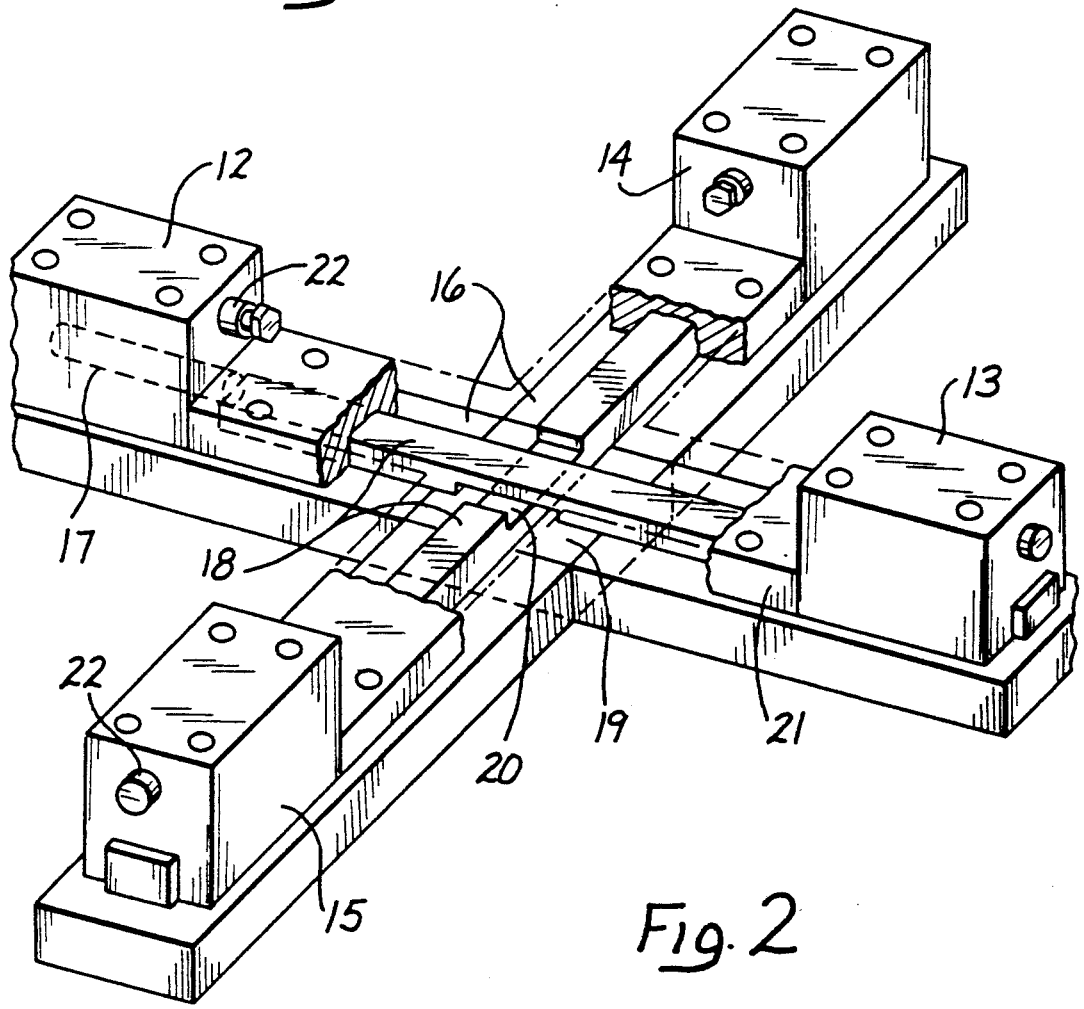
FIG. 2 is a perspective view of a four chuck element assembly.

FIG. 2 shows centering clamp elements 12, 13, 14, and 15 which are individual elements, and are bolted to a rasterplate 16 in a pairwise facing relation. The several drive slides 17 engage under interpositioning of rod pieces 18. These rods may be simple thrust rods and come in a variety of lengths so that different dimensions of clamping may be accommodated. The raster plate is partitioned at the rod intersection and bolted in a radial pattern through a connecting piece 19. The rod intersection 20 has cut outs in the same level as the rods 18. The two rods, and therefore the intersecting directions of movement, are path-independent and thus permit independent centering from two sides. It is desirable that a workpiece can still be shifted by one centering pair, e.g., 12 and 13, after the other pair, 14 and 15 has already clamped tight. Thus the force lines have to be interconnected in a pressure compensating fashion.

The rod pieces 18 and their intersection are covered to be protected against kinking and soiling. The centering slides 22 extend from opposite sides so that one may center from the inside or from the outside of the workpiece. Also, adjusting screws are screwed onto these slides 22, for purposes of fine adjustment. The variable construction shown here permit for the first time the realization of both very small and very large centering dimensions under utilization of the same clamping elements without requiring expensive chucks.

Figure 3:
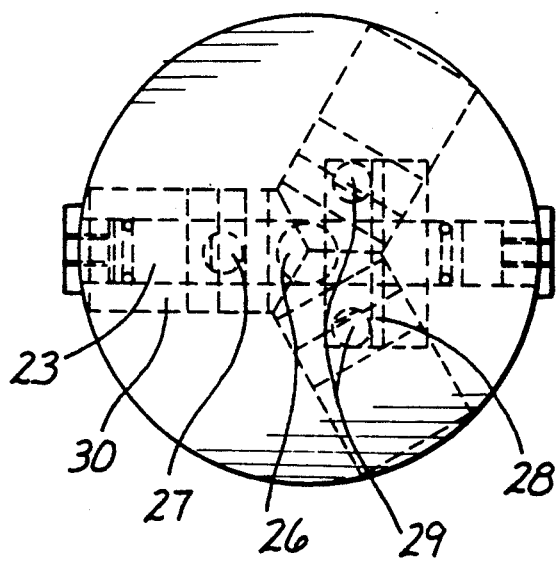
FIG. 3 is a view from below but showing also a longitudinal view of one element of a fixed three chuck and bracket self centering device.
Figure 3A:
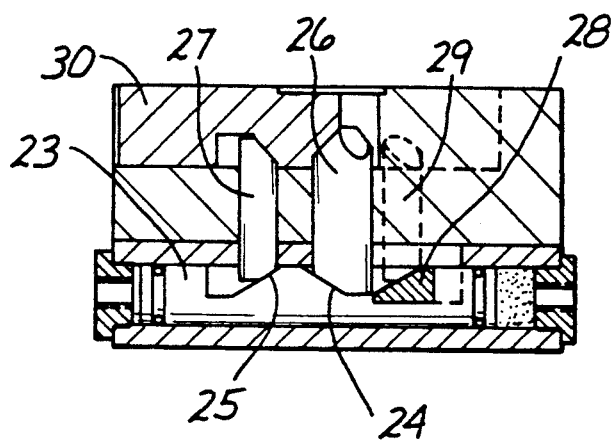

FIG. 3 illustrates a three-chuck clamp of stationary design. A drive slide 23 drives centrally a main pin 26 and to the left an auxiliary pin 27, respectively, under utilization of wedge configurations, 24 and 25. A wedge piece 28 sits on the slide 23 and drives two additional auxiliary pins 29. The device includes several centering clamping slides 20 and they are moved outwardly by the upper wedge configurations of the main shift pin 26 while the wedge configurations of the auxiliary pins 27 and 29 provide the inwardly direction movement.

In order to make surface that the paths are the same, the upper and lower wedge configurations of the auxiliary pin 29 to the right have to be turned in relation to each other by 60°. This kind of chuck has only the usual smaller dimensional variability; it does, however, have superior holding force capabilities, a significant robustness, is free from play and its parts are quire simple.

Figure 4:
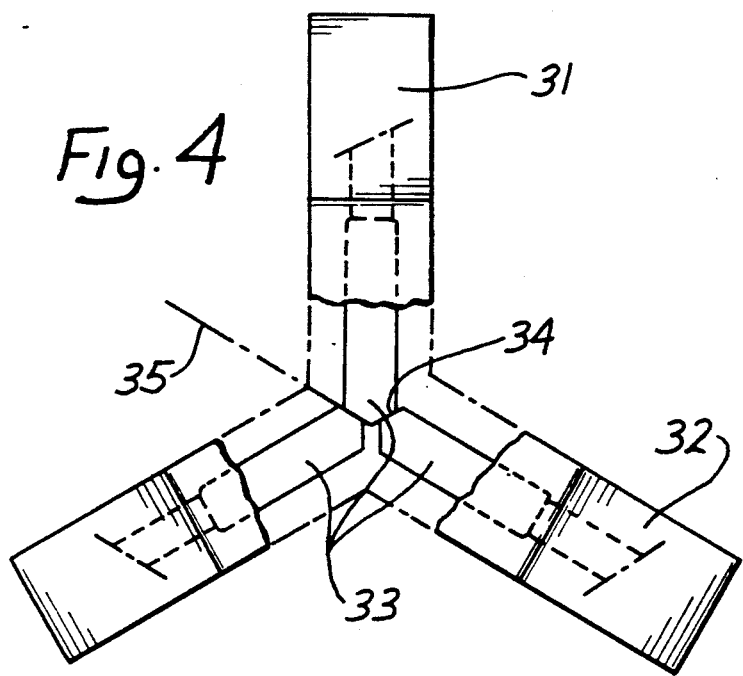
FIG. 4 is a top elevation of a three element assembly, using variable elements in a three-intersection configuration.

FIG. 4 shows also a three-clamping element construction having three thrustrods 33 which run between three variable elements 31 and 32, and meet and engage through roof-like end faces 34. They all travel for the same length, because the angles of the oblique portions are determined by the angle bisector 35. Adjusting movement on closing is, for example, transmitted upon one of the elements such as 31 while the retraction is transmitted upon the two others, 32. It can readily be seen that with these three element assemblies as well as with four chuck element construction, one can accommodate any kind of centering structure.

Figure 5:
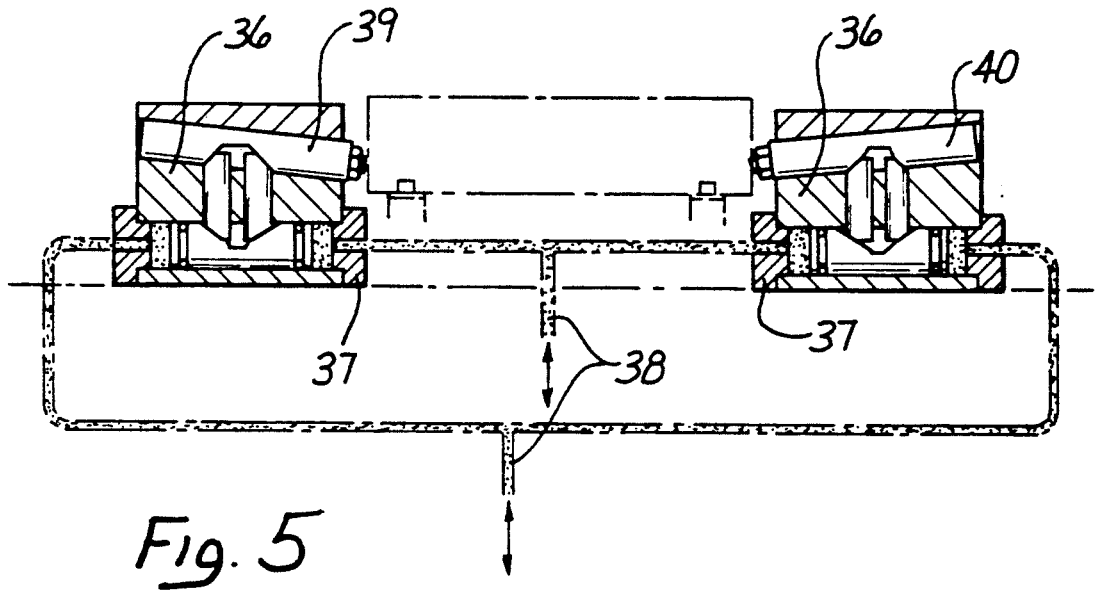
FIG. 5 is a longitudinal section view through an assembly of two variable elements for a floating clamping action.

For purposes of providing floating clamping action, the respective variable elements 36 as shown in FIG. 5 are covered by a lid or cover 37 in that location which previously was provided with an opening. The hydraulic lines 38 are now connected as shown. Friction in the twin wedge shifting causes this; for instance the left-hand centering slide 39 approaches a determined workpiece position and waits there for the right-hand one, 40. As the latter arrives, they both now exert clamping action upon the workpiece. The holding forces now make sure that the workpiece position is positively maintained. In order to obtain a low tension effect the slides 39 and 40 are a little inclined.

Figure 6:
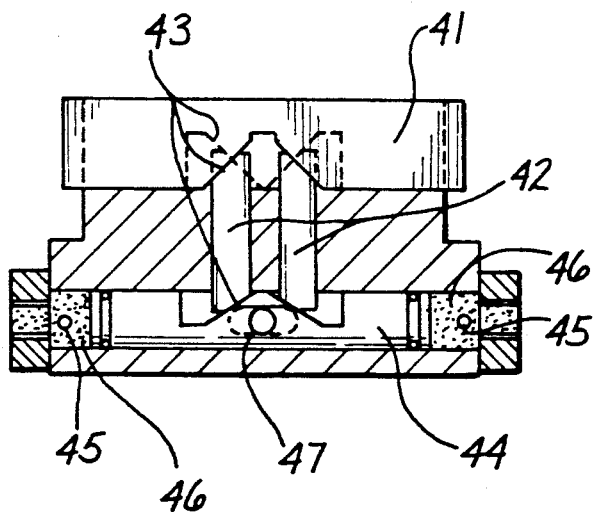
FIG. 6 is a longitudinal section and a side section through an element being optional with regard to floating clamping action of a two-bracket packing.
Figure 6A:
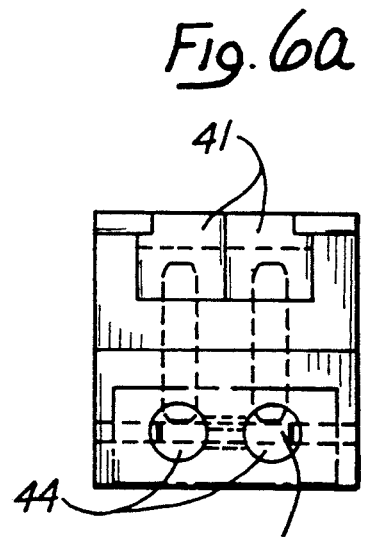

FIG. 6 shows a stationary mounting element with two abutting centering slides 41. These slides are moved through altogether four pins 42 with oppositely oriented wedge surfaces and configurations, 43; in addition, two parallelly oriented drive slides 44 are provided for moving these slides 41. Oil chambers 46 are provided in the ends of the slides 44, and these chambers are interconnected in pairs by means of channels 45. Oppositely positioned transverse bores 47 are provided in the drive slides to permit insertion of a pin 48. This way the two driveslides 44 are interconnected. One removing this pin, a floating clamping action obtains as earlier described in principle. Also in this case the same element can be used for regular clamping and centering by using this pin 48 precisely to interconnect the two drive slides 44.

The invention offers these advantages; height levels of clamping are significant and the effectiveness is height independent. Since the driving of the centering slides being obtained via the pins can be made to be effective right at the clamping point (or at least very close thereto), the clamping pressure is reacted into stationary housing parts and not upon movable parts that could be prone to tilting. This is the reading for the lack of, in principle, any height limitations. And still no loss in effectiveness will incur.

Owing to the friction of and in the twin shifting action under utilization of wedge configuration, there is a multiplier effect so that the holding forces can be a multiple of the clamping force. This avoids the well known but highly undesirable slipping of the workpiece in the case of impacts of some kind during working. Also, delicate workpieces cannot be clamped very forcefully and still provide adequate holding forces in order to avoid the problem.

The inventive drive slides permit operation that is exclusively tied to thrust: clamping engagement from one side, release from the other. They can thus be appropriately assigned and supplemented in a very simple manner by means of simple and guided thrustrod pieces. In this manner, centering can be apportioned into variable chuck elements placed at any convenient distance from each other, without having to increase the entire chuck housing. This, in turn, drastically modifies the size limitations as to large work pieces.

Another advantage is the combinability even with independent movements. For example, by means of simple thrust rod intersections or intersections of the drive slides generally, or through three element or four element chucks one can assemble a large variety of types of fixed or variable chuck and clamping structures. Herein it is of significant advantage that movements generally for the clamping can be made independent of each other. This way one may assemble, for instance, a four bracket chuck that will center accurately even very poorly fitting workpieces.

A still further advantage is the low height of the device. This is a feature that is particularly important for non-contact machine tools and control. The slides in this case may use rods directly as pistons, or they may be operated laterally. Thus, an inventive arrangement is inherently lower than any device that works with upright piston drives. On the other hand, the standing shift pins are actually quite slim and, therefore, can be very short and thus not contribute to any undue vertical dimension. This is not the case, for example, in key way structures alluded to above. A particular advantage is to be seen in the fact that the entire slide and shifting arrangement is always placed and positioned next to the workpiece. Thus the level relevant for the workpiece support is determined only by the drive slides or thrust rods passing through.

Generally, of course, there is inherent play in the various parts, such as in the guide structure for the slides, as well as for the shift pins. However, owing to the force bias, that play is in effect eliminated even after extensive use. There is an inherent floating adjustment in that for similar workpieces but variable pressure, the clamping pressure is so to speak selfmatching as far as a predetermined workpiece position is concerned. This is, in effect, a frequently used supplemental feature. The fact that the overall construction is rugged, simple, and economical is directly evident from the construction as described. In addition, the shift unit is automatically lubricated.

These advantages render the inventive constructions generally, and the centering clamping in particular, highly desirable, particularly also in the case of a stationary use. In other words, with the invention one will more frequently use self-centering than it was heretofore practiced and that in turn will save otherwise wasted material.

The invention is not limited to the embodiments described above, but all changes and modifications thereof, not constituting departments from the spirit and scope of the invention, are intended to be included.

We claim:

1. Self-centering chuck, comprising:
   a plurality of centering and clamping slides disposed for slide movement to or from a common center, said clamping slides having particularly oriented wedge surfaces;
   drive slide means associated with said centering and clamping slides, said centering slides having parallel or slightly oblique orientation to the drive slide means so as to slidingly move at least essentially parallel to the slide movement of at least one of the centering and clamping slides, said drive slide means also having particularly oriented wedge surfaces;
   a plurality of shift pins extending transversely to said centering and clamping slides and to the drive side means and cooperating with wedge surfaces of the centering and clamping slides and with the wedge surfaces of the drive slide means, to couple the drive slide means to the centering and clamping slides as associated to obtain movement to or from the center of all centering slides;
   said shift pins each moving in one direction in relation to the respective centering and clamping slide when the drive slide means moves in one direction, and said shift pins moving in an opposite direction when the drive slide means moves in the opposite direction, the movements of the pins essentially transversely to the movements of the slides;
   said drive slide means being connected to the shift pins such that for uniform movement of the drive slide means in one direction, at least two centering and clamping slides move oppositely in relation to each other; and
   said pins having wedge surfaces at their respective ends, the wedge surfaces being steeper at one end as compared with the opposite end of the same pin.

2. Chuck as in claim 1, the particularly oriented said shift pins being arranged in pairs cooperating with the oppositely oriented wedge surfaces on the respective clamping slide such that the pins of the pair are displaced in opposite directions.

3. Chuck as in claim 1 the drive slide means being a single slide, the wedge surfaces being oriented such that for one or the opposite direction of movement of the simple slide, all clamping slides move towards or away from each other.

4. Chuck as in claim 1, the cooperating wedge surfaces of the pins and of the respective cooperating wedge surfaces for the centering slides being steeper than the corresponding cooperating wedge surfaces of the pins and of the drive slide means.

5. Self-centering chuck, comprising:
   two pairs of centering slides disposed for movement to or from a common center;
   two corresponding drive slide means respectively associated with the pairs of centering slides and each drive slide means having parallel or slightly oblique orientation thereto;
   said drive slide means and said centering slides each have at least two wedge surfaces;
   a plurality of shift pins having wedge surfaces at their respective ends, for cooperating with the wedges surfaces of the slides and of the drive slide means, to couple the drive slide means to the centering slides as associated to obtain slide movement of the centering slides to or from the center of all centering slides;

wedge surfaces of said pins, centering slides and said drive slide means being constructed such that for uniform slide movement of one of the drive slide means in one direction the two centering slides are associated with that particular drive slide means move oppositely in relation to each other; and the pins each shift in opposite directions for opposite directions of movement of the respective drive slide means, the pins shifting essentially transversely to the slide movement of the drive slide means and of the centering slides.

6. Chuck as in claim 5, said shift pins being arranged in pairs cooperating with said wedge surfaces being oppositely oriented wedge surfaces such that the pins of the pair are displaced in opposite directions.

7. Chuck as in claim 5, each drive slide means having two drive slides forming a pair, the drive slides of a pair being interconnected by means of rods.

8. Chuck as in claim 7, the wedge surfaces of the drive slides of a pair being oriented such that for movement of the interconnected drive slides of a pair, the clamping slides of the associated pair move in opposite directions.

9. Chuck is in claim 7, the rods of two pairs of drive slides intersecting in the common center.

10. Chuck as in claim 7, the rods of extendable length.

11. Chuck as in claim 5, the drive slides of a pair are interconnected hydraulically.

12. Self-centering chuck, comprising:

three centering slides disposed for movement in a common plane to or from a common center;

a single drive slide associated with and positioned in relation to said centering slide and mounted for reciprocation in a plane substantially parallel that of said centering slides; and a plurality of shift pins including at least four pins having at their respective ends wedge surfaces three of said four pins being respectively associated with the three centering slides and the wedge surfaces of the pins cooperating with wedge surfaces of the drive slide and with wedge surfaces of the centering slides to couple the single drive slide to the centering slides; and the pins moving towards or away from the single drive slide, respectively away and towards the respective centering slide, to cooperatively obtain movement of the centering slides to or from the center of all centering slides, as the drive slide moves in one of the opposite direction.

13. Chuck as in claim 12, a fourth one of the pins having wedge surfaces and being centrally positioned such that the fourth pin is coupled to all three slide elements, and the three pins arranged in a star pattern in relation to the centrally positioned fourth pin and respectively coupled to the three centering elements.

14. Self-centering chuck, comprising:

a plurality of centering and clamping slides disposed for slide movement to or from a common center, said centering and clamping slides having particularly oriented wedge surfaces;

drive slide means associated with said centering and clamping slides, said centering and clamping slides having parallel or slightly oblique orientation to the drive slide means so as to slidingly move at least essentially parallel to the movement of at least one of the centering and clamping slides, said drive slide means also having particularly oriented wedge surfaces;

a plurality of pairs of shift pins extending and moving transversely to said slides and to the drive slide means and cooperating with wedge surfaces of the slides and of the drive slide means, to couple the drive slide means to the centering and clamping slides as so associated by means of the pins, to obtain movement to or from the center of all of the clamping and centering slides;

the shift pins of each pair of the plurality of pairs of shift pins moving in opposite directions respectively towards the respective clamping slide and away therefrom when the drive slide means moves in one direction, and each pin of a pair of pins moves oppositely when the drive slide means moves in the opposite direction; and said drive slide means being connected to the shift pins of each pair through differently oriented ones of the wedge surfaces such that for uniform movement of the drive slide means in one direction, at least two centering slides move oppositely in relation to each other.

15. Chuck as in claim 14, the drive slide means including individual drive slides and interconnect means.

16. Chuck as in claim 14 the drive slide means being a single slide, the wedge surfaces being oriented such that for one or the opposite direction of movement of the single slide, all clamping slides move towards or away from each other.

17. Chuck as in claim 14, the wedge surfaces of the pins and of the respective cooperating wedge surfaces for the centering slides being steeper than the corresponding cooperating surfaces of the drive slide means.

18. Chuck as in claim 14, the pins of a pair moving opposite in relation to each other and with the pin ends of the pair facing in the same direction cooperating with wedge surfaces that face in different directions.

19. Chuck as in claim 12, there being a central pin with three oblique surfaces at each end for interaction with the drive slide, one of the other pins being directly acted upon by the drive slide, there being wedge pieces interposed between the drive slide and the two other pins for coupling them drivingly together.

* * * * *